US008477575B2

(12) United States Patent
Takeda (10) Patent No.: US 8,477,575 B2
(45) Date of Patent: Jul. 2, 2013

(54) OPTICAL DISC APPARATUS

(75) Inventor: Futoshi Takeda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/484,441

(22) Filed: May 31, 2012

(65) Prior Publication Data

US 2012/0314551 A1 Dec. 13, 2012

(30) Foreign Application Priority Data

Jun. 7, 2011 (JP) .................................. 2011-127471

(51) Int. Cl.
*G11B 7/00* (2006.01)
(52) U.S. Cl.
USPC ....................................................... 369/44.23
(58) Field of Classification Search
None
See application file for complete search history.

(56) References Cited

U.S. PATENT DOCUMENTS

| 7,768,880 B2 | 8/2010 | Sagara |
| 2003/0202437 A1 | 10/2003 | Yamada et al. |
| 2007/0183277 A1 | 8/2007 | Matsumoto et al. |
| 2008/0144461 A1 | 6/2008 | Shimizu et al. |

FOREIGN PATENT DOCUMENTS

| JP | 2000-268377 A | 9/2000 |
| JP | 2004-241100 | 8/2004 |
| JP | 2005-038472 | 2/2005 |
| JP | 2005251255 A * | 9/2005 |
| JP | 2007-213643 A | 8/2007 |
| JP | 2008-071456 A | 3/2008 |
| JP | 2008-084417 | 4/2008 |
| JP | 4407623 B2 | 11/2009 |
| JP | 4556117 B2 | 7/2010 |

OTHER PUBLICATIONS

English machine translation of JP 2005-251255 A (Seiko Yamada, Optical Information Recording and Reproducing Apparatus, published Sep. 2005).*
Office Action issued in corresponding Japanese Patent Application No. 2011-127471 dated Apr. 16, 2013.

* cited by examiner

*Primary Examiner* — Hoa T Nguyen
*Assistant Examiner* — Mark Fischer
(74) *Attorney, Agent, or Firm* — Morgan, Lewis & Bockius LLP (57) ABSTRACT

Before tracking control is turned on, there is determined a correction formula for correcting a balance value of a tracking error signal depending on a position of a movable lens for spherical aberration correction. Then, after the tracking control has been turned on, using an RF signal as an index, the adjustment of the position of the movable lens for spherical aberration correction is performed, while the balance value of the tracking error signal is corrected by use of the correction formula. An adjustment value for adjusting the balance value of the tracking error signal at a time point of completing the adjustment of the position of the movable lens for spherical aberration correction is stored.

7 Claims, 6 Drawing Sheets

OPTICAL DISC APPARATUS

This nonprovisional application claims priority under 35 U.S.C. §119(a) on Patent Application No. 2011-127471 filed in Japan on Jun. 7, 2011, the entire contents of which are hereby incorporated by reference.

BACKGROUND OF THE INVENTION

1. Field of the Invention

The present invention relates to an optical disc apparatus.

2. Description of Related Art

In a typical optical disc apparatus, upon start-up, adjustments are performed by following a procedure described below.

First, using a tracking error signal as an index, a rough adjustment of spherical aberration correction is performed, followed by automatic gain control of the tracking error signal, and tracking control is pulled in. Moreover, after that, using an RF signal as an index, a fine adjustment of spherical aberration correction is performed, and a focus control loop gain and a tracking control loop gain are adjusted, after which the start-up is completed. This completion of the start-up enables playback of an optical disc.

In the fine adjustment of spherical aberration correction carried out after tracking control has been turned on, however, a balance value of a tracking error signal varies with a change in the position of a movable lens for spherical aberration correction disposed in an optical system of an optical pickup, and due to the variation in the balance value, a tracking servo may become unlocked, rendering the adjustment in progress unable to be continued.

JP-A-2008-84417, JP-A-2004-241100, JP-A-2005-38472, the publication of Japanese Patent No. 4407623, and the publication of Japanese Patent No. 4556117 disclose arts related to spherical aberration correction. None of these, however, discloses or suggests a technique for preventing, when spherical aberration correction is performed, a tracking servo from becoming unlocked due to a variation in the balance value of a tracking error signal.

SUMMARY OF THE INVENTION

An object of the present invention is to provide an optical disc apparatus that is capable of preventing a tracking servo from becoming unlocked during and after an adjustment at start-up in which an RF signal is used as an index.

In order to achieve the above-described object, an optical disc apparatus according to the present invention includes: an optical pickup that irradiates an optical disc with light and detects returned light from the optical disc by use of a photodetector; a tracking error signal generation portion that generates a tracking error signal by processing an electric signal outputted from the photodetector; an RF signal generation portion that generates an RF signal based on an electric signal outputted from the photodetector; a movable lens position adjustment portion that adjusts and controls a position of a movable lens for spherical aberration correction disposed in an optical system of the optical pickup; a servo control portion that performs, based on the tracking error signal, tracking control of the optical pickup; a correction formula determination portion that, before the tracking control by the servo control portion is turned on, determines a correction formula for correcting a balance value of the tracking error signal depending on the position of the movable lens for spherical aberration correction; an adjustment portion that, after the tracking control by the servo control portion has been turned on, using the RF signal as an index, adjusts the position of the movable lens for spherical aberration correction by use of the movable lens position adjustment portion, while correcting the balance value of the tracking error signal by use of the correction formula determined by the correction formula determination portion; and a storage portion that stores an adjustment value for adjusting the balance value of the tracking error signal at a time point of completing the adjustment of the position of the movable lens for spherical aberration correction by the adjustment portion.

Furthermore, the correction formula may be a relational expression between the position of the movable lens for spherical aberration correction and the adjustment value for adjusting the balance value of the tracking error signal.

Moreover, the correction formula determination portion may detect values of the adjustment value for adjusting the balance value of the tracking error signal obtained when the movable lens for spherical aberration correction is at at least two different positions, respectively, at which the balance value of the tracking error signal becomes optimum, and determine the correction formula based on a result of the detection. Particularly in a case where the correction formula determination portion detects values of the adjustment value for adjusting the balance value of the tracking error signal obtained when the movable lens for spherical aberration correction is at two different positions, respectively, at which the balance value of the tracking error signal becomes optimum, and determines a linear approximate expression based on a result of the detection to use it as the correction formula, the time required for determining the correction formula can be reduced.

Furthermore, in consideration of, for example, a possibility that the adjustment value for adjusting the balance value of the tracking error signal might be adversely affected when the adjustment portion fails to properly perform the adjustment for some reason, in the correction formula, an upper limit value and a lower limit value of the adjustment value for adjusting the balance value of the tracking error signal may be set.

DETAILED DESCRIPTION OF PREFERRED EMBODIMENT

Figure 1:
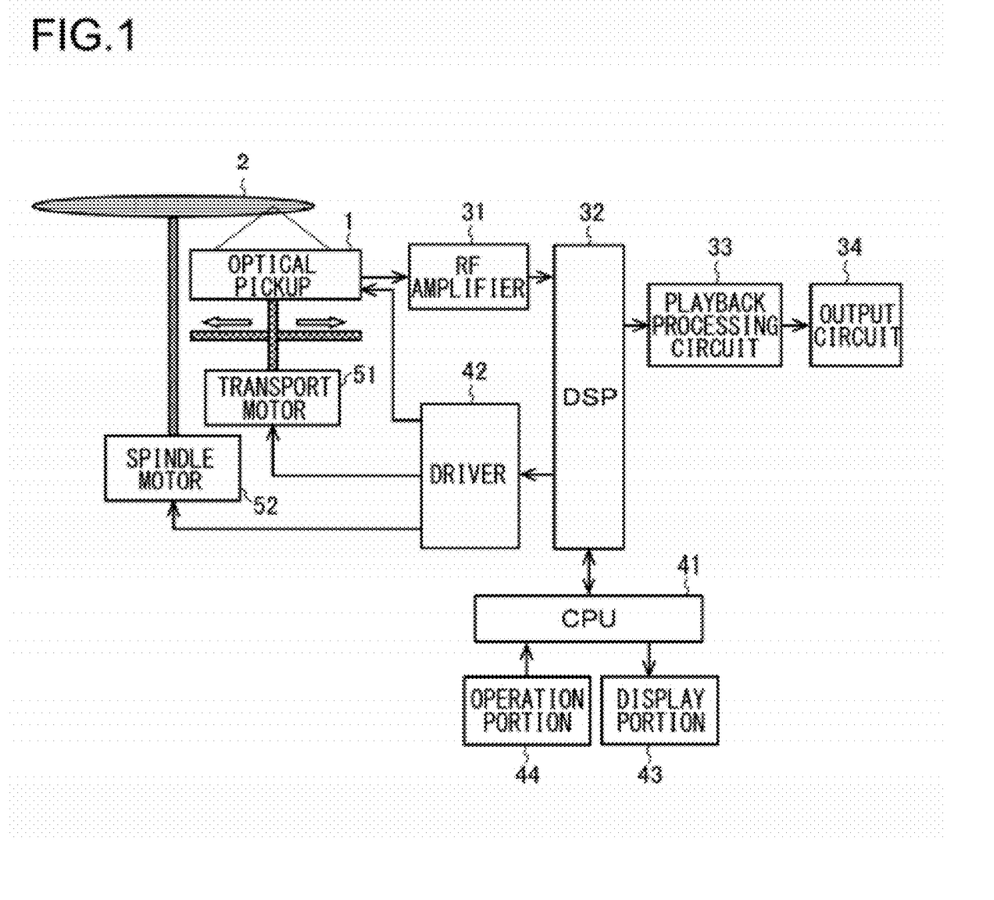
FIG. 1 is a diagram showing a schematic configuration of an optical disc apparatus according to one embodiment of the present invention.

The following describes an embodiment of the present invention with reference to the appended drawings. FIG. 1 shows a schematic configuration of an optical disc apparatus according to one embodiment of the present invention.

The optical disc apparatus according to one embodiment of the present invention is an optical disc apparatus that is capable of handling single-sided multilayer optical discs and includes an optical pickup 1, an RF amplifier 31, a DSP (digital signal processor) 32, a playback processing circuit 33, an output circuit 34, a CPU (central processing unit) 41, a driver 42, a display portion 43, an operation portion 44, a transport motor 51, and a spindle motor 52.

The optical pickup 1 irradiates an optical disc 2 with a light beam and thereby reads various types of information such as audio information, video information, and so on recorded on the optical disc 2. The optical pickup 1 is capable of irradiating the optical disc 2 with an infrared laser beam in a wavelength band of 780 nm (a laser beam for CDs (compact discs)), a red laser beam in a wavelength band of 650 nm (a laser beam for DVDs (digital versatile discs)), and a blue laser beam in a wavelength band of 405 nm (a laser beam for BDs (Blu-ray Discs: registered trademark)). The interior of the optical pickup 1 will be described later in detail.

Audio information and video information obtained by the optical pickup 1 are converted into audio and video, respectively, by the RF amplifier 31, the DSP 32, the playback processing circuit 33, and the output circuit 34, and the audio and video thus obtained are outputted from a speaker and a monitor, respectively, which are not shown. The RF amplifier 31 amplifies an audio signal, a video signal, and so on from the optical pickup 1. The DSP 32 and the playback processing circuit 33 subject signals from the RF amplifier 31 to various types of information processing for playback (for example, video processing, and so on). The output circuit 34 subjects signals from the playback processing circuit 33 to D/A conversion processing and so on in order for the signals to be outputted to the speaker and the monitor, which are not shown.

The DSP 32 also performs computation processing based on signals outputted from a photodetector 20 (see FIG. 2) and generates a focus error signal, a focus servo signal, a tracking error signal, and so on.

The CPU 41 accepts information from the operation portion 44 and transfers the information to the DSP 32, while it also transfers information from the DSP 32 to the display portion 43.

Based on a command from the DSP 32, the driver 42 controls respective operations of the transport motor 51 and the spindle motor 52. The transport motor 51 moves the optical pickup 1 in a radial direction of the optical disc 2. The spindle motor 52 drives the optical disc 2 to rotate in a rotation direction thereof.

Furthermore, based on a command from the DSP 32, the driver 42 also controls respective operations of an actuator 21 and a BEX (beam expander) motor 22 (see FIG. 2) in the optical pickup 1.

Figure 2:
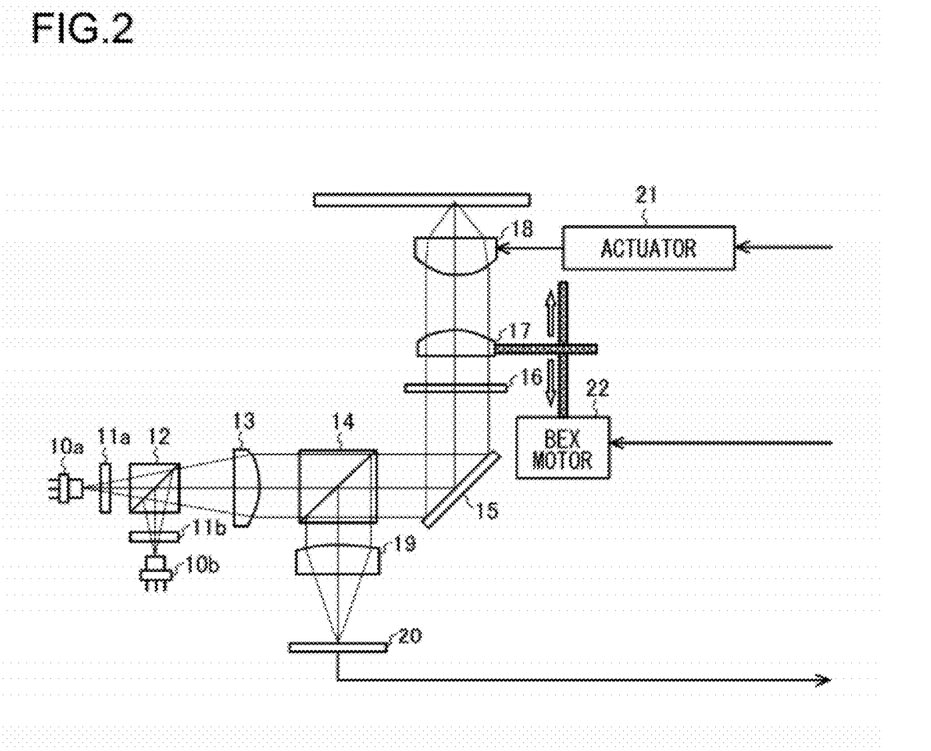
FIG. 2 is a diagram showing a schematic configuration of an optical pickup included in the optical disc apparatus according to one embodiment of the present invention.

Next, FIG. 2 shows a schematic configuration of the optical pickup 1 included in the optical disc apparatus according to one embodiment of the present invention.

The optical pickup 1 includes a first light source 10a, a second light source 10b, a first grating 11a, a second grating 11b, a dichroic prism 12, a collimator lens 13, a beam splitter 14, a raising mirror 15, a quarter wavelength plate 16, a collimator lens 17, an objective lens 18, a detection lens 19, the photodetector 20, the actuator 21, and the BEX motor 22.

The first light source 10a is a two-wavelength integrated LD that is capable of emitting an infrared laser beam in a wavelength band of 780 nm (a laser beam for CDs) and a red laser beam in a wavelength band of 650 nm (a laser beam for DVDs). The second light source 10b is an LD that is capable of emitting a blue laser beam in a wavelength band of 405 nm (a laser beam for BDs).

The first grating 11a diffracts a laser beam emitted from the first light source 10a and outputs diffracted light thus obtained to the dichroic prism 12. The second grating 11b diffracts a laser beam emitted from the second light source 10b and outputs diffracted light thus obtained to the dichroic prism 12.

The dichroic prism 12 transmits therethrough diffracted light outputted from the first grating 11a and reflects diffracted light outputted from the second grating 11b. Respective optical axes of the diffracted light outputted from the first grating 11a and the diffracted light outputted from the second grating 11b are made to coincide with each other. The diffracted light (a laser beam) that has been transmitted through or reflected by the dichroic prism 12 is sent to the collimator lens 13.

The collimator lens 13 converts a laser beam sent from the dichroic prism 12 into parallel light. The laser beam that has been converted into the parallel light by the collimator lens 13 is sent to the beam splitter 14.

The beam splitter 14 functions as a light separation element that separates laser beams incident thereon, transmitting therethrough a light beam sent from the collimator lens 13 so as to guide it to an optical disk 2 side, while reflecting light reflected off the optical disk 2 so as to guide it to a photodetector 20 side. The laser beam that has been transmitted through the beam splitter 14 is sent to the raising mirror 15.

The raising mirror 15 reflects a light beam that has been transmitted through the beam splitter 14 so as to guide it to the optical disc 2. The raising mirror 15 is in a state of being inclined at 45° with respect to an optical axis of a laser beam sent from the beam splitter 14, and an optical axis of a laser beam that has been reflected by the raising mirror 15 is substantially orthogonal to a recording surface of the optical disc 2.

Having a function of converting linearly polarized light into circularly polarized light and circularly polarized light into linearly polarized light, the quarter wavelength plate 16 converts a laser beam of linearly polarized light reflected by the raising mirror 15 into circularly polarized light to send it to the collimator lens 17 and converts a laser beam of circularly polarized light reflected from the optical disc 2 into linearly polarized light to send it to the raising mirror 15.

The collimator lens 17 can be moved in an optical axis direction (the vertical direction in FIG. 2) by the BEX motor 22. Depending on how the collimator lens 17 is moved, a laser beam emitted from the collimator lens 17 can be brought to a diverging state or to a converging state. Changing the state of a laser beam emitted from the collimator lens 17 in this manner allows spherical aberration to be corrected. A laser beam emitted from the collimator lens 17 is sent to the objective lens 18.

The objective lens 18 focuses a laser beam sent from the collimator lens 17 onto the recording surface of the optical disc 2. Furthermore, the objective lens 18 can be moved in, for example, the vertical direction and the lateral direction in FIG. 2 by the actuator 21, which will be described later, and the position thereof is controlled based on a focus servo signal and a tracking servo signal.

Light reflected off the optical disc 2 passes through the objective lens 18, the collimator lens 17, and the quarter wavelength plate 16 in this order to be reflected by the raising mirror 15 and is then further reflected by the beam splitter 14 to be focused by the detection lens 19 to a light receiving element provided on the photodetector 20.

Figure 3:
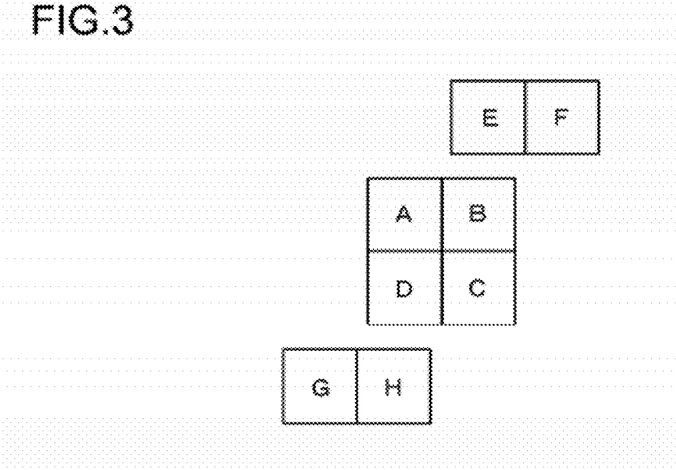
FIG. 3 is a diagram showing light receiving regions of a photodetector.

The photodetector 20 converts information on light received by use of the light receiving element such as a photodiode or the like into an electric signal and outputs it to the DSP 32 (see FIG. 1). As shown in FIG. 3, the photodetector 20 has main light receiving regions A to D obtained by longitudinal and transverse division into four equal regions, sub light receiving regions E and F obtained by transverse division into two equal regions, and sub light receiving regions G and H obtained by transverse division into two equal regions. With respect to each of these regions, the photodetector 20 performs photoelectric conversion and outputs an electric signal obtained thereby. Each of the main light receiving regions A to D is a region for receiving 0th order diffracted light (a main beam), and each of the sub light receiving regions E to H is a region for receiving 1st order diffracted light (a sub-beam). The DSP 32 is capable of generating a focus error signal by subtracting a sum of an electric signal SB obtained from the region B and an electric signal SD obtained from the region D from a sum of an electric signal SA obtained from the region A and an electric signal SC obtained from the region C, and of generating a focus sum signal by adding up the electric signals SA to SD obtained from the regions A to D, respectively. Furthermore, the DSP 32 has a tracking error signal generation circuit that generates a tracking error signal based on the electric signals SA to SH obtained from the regions A to H, respectively. The tracking error signal generation circuit will be described later in detail.

In accordance with an objective lens driving signal generated in and outputted from the driver 42 (see FIG. 1), the actuator 21 moves the objective lens 18 in the radial direction of the optical disc 2.

The actuator 21 is capable of performing, in addition to a tracking operation in which the objective lens 18 is moved in a direction along the recording surface of the optical disc 2, a tilt operation in which the objective lens 18 is moved to be tilted so that an optical axis of a laser beam emitted from the objective lens 18 is swung and a focus operation in which the objective lens 18 is moved to be close to or away from the optical disc 2.

Figure 4:
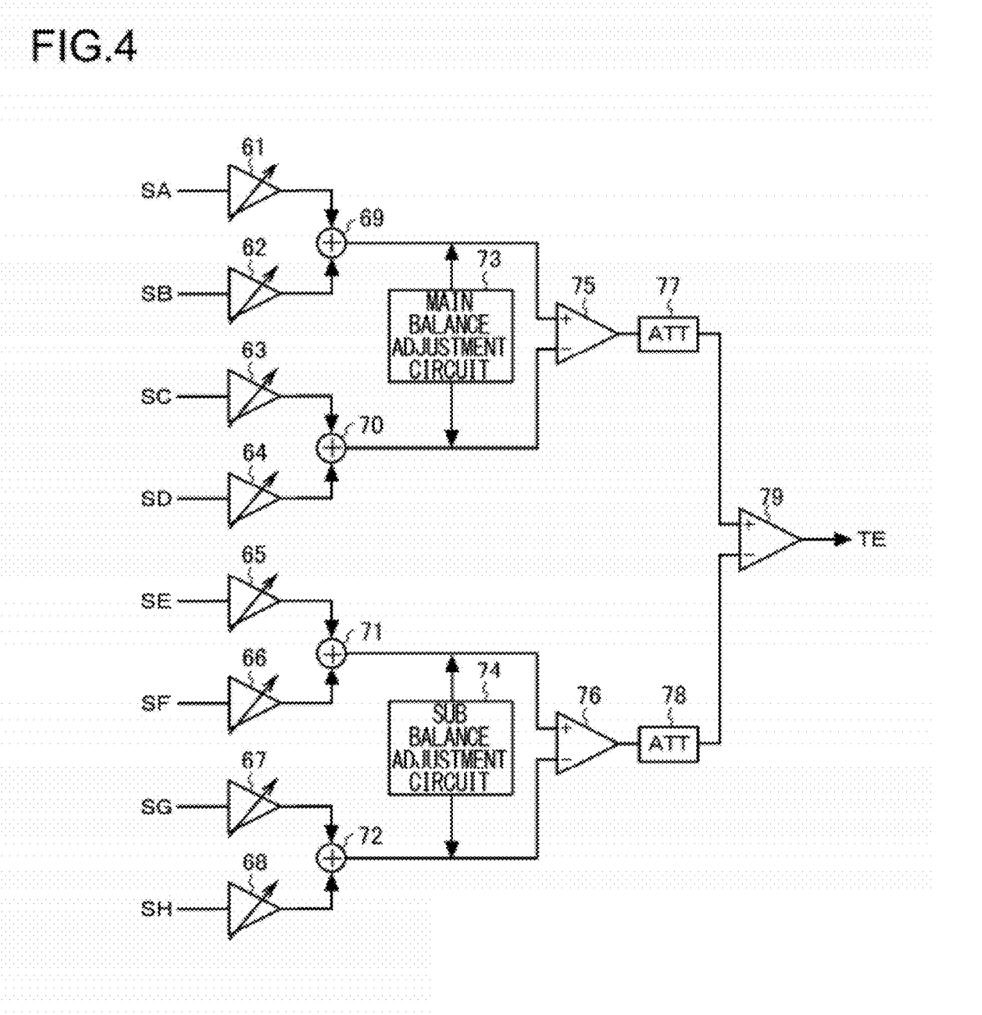
FIG. 4 is a diagram showing a schematic configuration of a tracking error signal generation circuit.

Next, FIG. 4 shows a schematic configuration of the tracking error signal generation circuit included in the DSP 32. The tracking error signal generation circuit shown in FIG. 4 includes variable gain amplifiers 61 to 68, adders 69 to 72, a main balance adjustment circuit 73, a sub balance adjustment circuit 74, a main differential amplifier 75, a sub differential amplifier 76, attenuators 77 and 78, and a composite differential amplifier 79.

The adder 69 adds up the electric signal SA after being amplified by the variable gain amplifier 61 and the electric signal SB after being amplified by the variable gain amplifier 62. The adder 70 adds up the electric signal SC after being amplified by the variable gain amplifier 63 and the electric signal SD after being amplified by the variable gain amplifier 64. The main balance adjustment circuit 73 multiplies a signal outputted from the adder 69 by a first balance coefficient and multiplies a signal outputted from the adder 70 by a second balance coefficient. The output signal of the adder 69 multiplied by the first balance coefficient is supplied to a non-inverted input terminal of the main differential amplifier 75, and the output signal of the adder 70 multiplied by the second balance coefficient is supplied to an inverted input terminal of the main differential amplifier 75. Based on the signals supplied to the non-inverted input terminal and the inverted input terminal, respectively, the main differential amplifier 75 generates a main push-pull signal and outputs it to the attenuator 77. The attenuator 77 attenuates the main push-pull signal and outputs the signal thus attenuated to a non-inverted input terminal of the composite differential amplifier 79.

The adder 71 adds up the electric signal SE after being amplified by the variable gain amplifier 65 and the electric signal SF after being amplified by the variable gain amplifier 66. The adder 72 adds up the electric signal SG after being amplified by the variable gain amplifier 67 and the electric signal SH after being amplified by the variable gain amplifier 68. The sub balance adjustment circuit 74 multiplies a signal outputted from the adder 71 by a third balance coefficient and multiplies a signal outputted from the adder 72 by a fourth balance coefficient. The output signal of the adder 71 multiplied by the third balance coefficient is supplied to a non-inverted input terminal of the sub differential amplifier 76, and the output signal of the adder 72 multiplied by the fourth balance coefficient is supplied to an inverted input terminal of the sub differential amplifier 76. Based on the signals supplied to the non-inverted input terminal and the inverted input terminal, respectively, the sub differential amplifier 76 generates a sub push-pull signal and outputs it to the attenuator 78. The attenuator 78 attenuates the sub push-pull signal and outputs the signal thus attenuated to an inverted input terminal of the composite differential amplifier 79.

Based on the main push-pull signal that has been attenuated by the attenuator 77 and the sub push-pull signal that has been attenuated by the attenuator 78, the composite differential amplifier 79 generates a tracking error signal TE. A balance value TBAL of the tracking error signal TE that is an index of amplitude balance of the tracking error signal TE is calculated by the DSP 32 (see FIG. 1). The DSP 32 (see FIG. 1) controls the main balance adjustment circuit 73 and the sub balance adjustment circuit 74 so as to change a main TBAL adjustment value (a ratio of the first balance coefficient to the second balance coefficient) and a sub TBAL adjustment value (a ratio of the third balance coefficient to the fourth balance coefficient), whereby the balance value TBAL of the tracking error signal TE can be adjusted.

Figure 5:
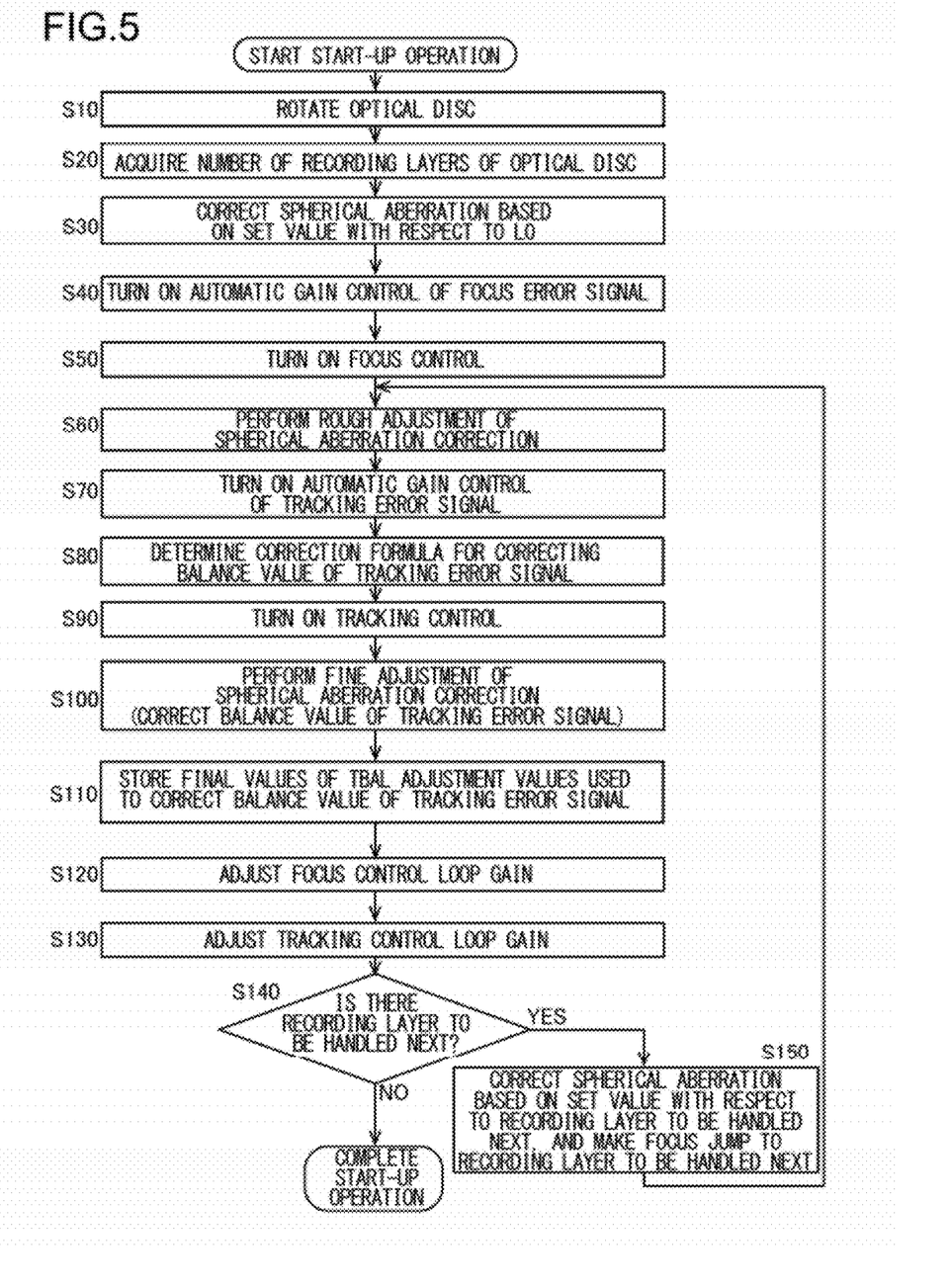
FIG. 5 is a flow chart showing a start-up operation of the optical disc apparatus according to one embodiment of the present invention.

The optical disc apparatus according to one embodiment of the present invention configured as above performs a start-up operation shown in FIG. 5 when the optical disc 2 is inserted therein.

Upon the start of the start-up operation shown in FIG. 5, first, the spindle motor 52 starts rotating the optical disc 2 (Step S10), and then the DSP 32 acquires the number of recording layers of the optical disc through a focus search (Step S20).

Next, based on a set value with respect to L0 measured beforehand in, for example, the manufacturing process of the apparatus, the BEX motor 22 moves the collimator lens 17 so as to perform spherical aberration correction (Step S30), after which the DSP 32 turns on automatic gain control of a focus error signal (Step S40), pulls in focus control to a recording layer L0 most distant from a laser light incidence side, and turns on the focus control (Step S50).

Then, using a tracking error signal as an index, the DSP 32 performs a rough adjustment of spherical aberration correction (Step S60) and then turns on automatic gain control of the tracking error signal (Step S70). When automatic gain control of a tracking error signal is on, the DSP 32 adjusts an amount of attenuation by each of the attenuators 77 and 78 depending on a variation in the sum total of the electric signals SA to SH outputted from the photodetector 20 so that the tracking error signal attains a predetermined amplitude level.

At Step S80 following Step S70, the DSP 32 determines a correction formula for correcting the balance value TBAL of the tracking error signal TE. Now, the following describes one example of a method for determining the correction formula with reference to FIG. 6.

Figure 6:
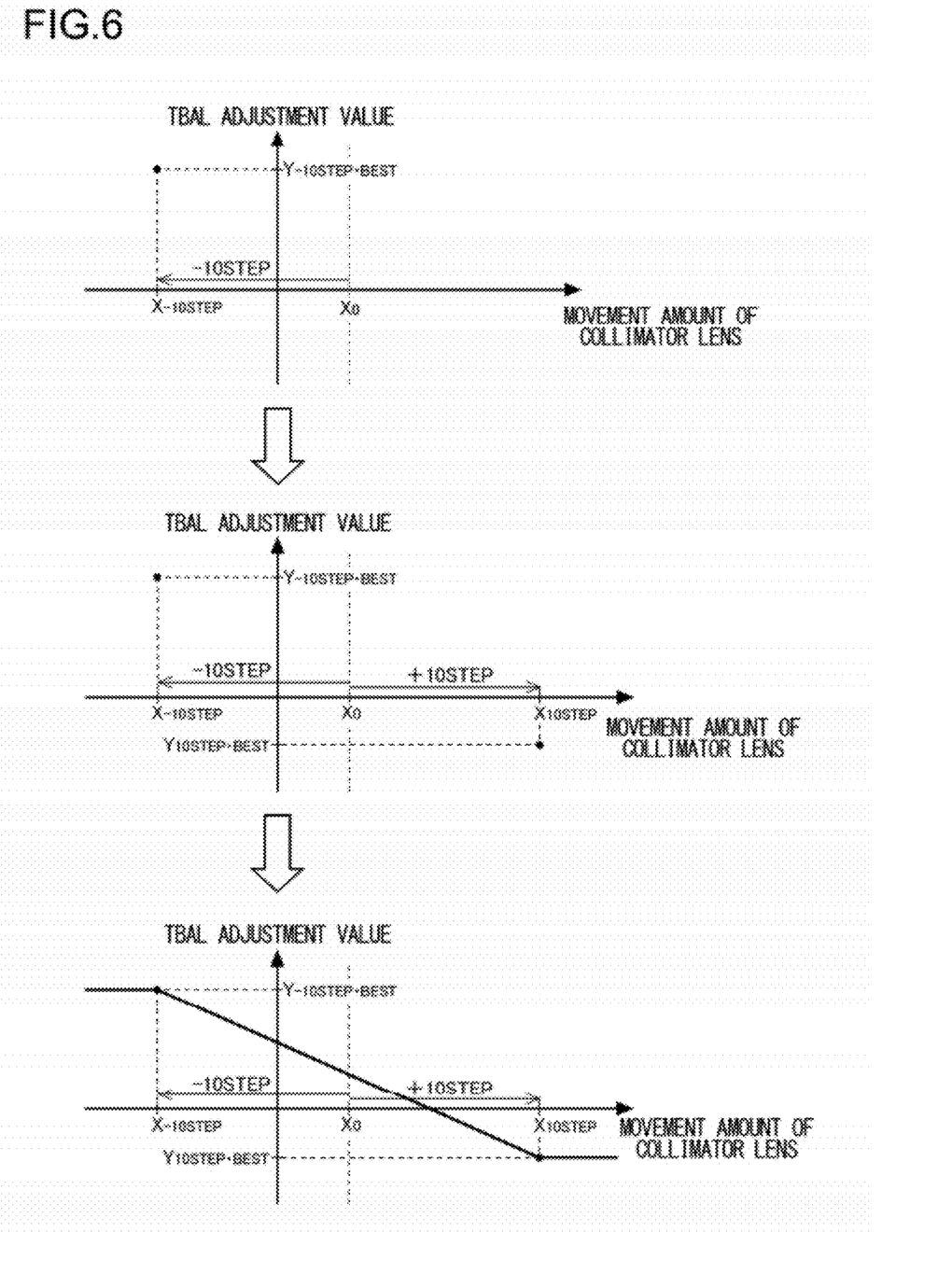
FIG. 6 is a diagram showing one example of a procedure for determining a correction formula for correcting a balance value of a tracking error signal.

It is assumed that, at a time point of starting Step S80, as a result of the rough adjustment of spherical aberration correction, the collimator lens 17 is set to be at a position defined by a movement amount $X_0$ from a reference position. First, the collimator lens 17 is moved to a position separated by −10STEP from the position defined by the movement amount $X_0$ from the reference position, and then a TBAL adjustment value $Y_{-10STEP\cdot BEST}$ at which the balance value TBAL of the tracking error signal TE becomes optimum is detected. Next, the collimator lens 17 is moved to a position separated by +10STEP from the position defined by the movement amount $X_0$ from the reference position, and then a TBAL adjustment value $Y_{+10STEP\cdot BEST}$ at which the balance value TBAL of the tracking error signal TE becomes optimum is detected. Finally, based on the two detected points described above, constants a and b of a linear approximate expression Y=aX+b between a movement amount X of the collimator lens 17 from the reference position and a TBAL adjustment value Y at which the balance value TBAL of the tracking error signal TE becomes optimum are determined, and the above-described correction formula is determined as follows: Y=aX+b (where $X_{-10STEP} \leq X \leq X_{10STEP}$), $Y=Y_{-10STEP}$ (where $X<X_{-10STEP}$), and $Y=Y_{+10STEP}$ (where $X_{10STEP}<X$). With respect to each of the main TBAL adjustment value and the sub TBAL adjustment value, the above-described correction formula is determined, and values of the constants determined thereby are stored in, for example, a memory incorporated in the DSP 32. The numbers of STEPs corresponding to the above-described detected points, i.e. ±10 are used as one example and may be other numerical values. Furthermore, there is also no particular limitation on a movement amount defining one STEP. Furthermore, while in the above-described example, based on the two detected points, the linear approximate expression between the movement amount X of the collimator lens 17 from the reference position and a TBAL adjustment value Y at which the balance value TBAL of the tracking error signal TE becomes optimum is determined, three or more detected points may be used, and a higher order approximate equation may be determined.

At Step S90 following Step S80, tracking control is pulled in and turned on. After that, using an RF signal outputted from the RF amplifier 31 as an index, the DSP 32 performs a fine adjustment of spherical aberration correction (Step S100). When performing the fine adjustment of spherical aberration correction, using the correction formulae determined at Step S80, the DSP 32 makes the main TBAL adjustment value and the sub TBAL adjustment value vary depending on a variation in the position of the collimator lens 17 so as to correct the balance value TBAL of the tracking error signal TE.

Upon completion of the fine adjustment of spherical aberration correction, the DSP 32 stores respective final values of the main TBAL adjustment value and the sub TBAL adjustment value used in the correction of the balance value TBAL of the tracking error signal TE in, for example, a memory incorporated in the DSP 32 (Step S110). After that, a focus control loop gain and a tracking control loop gain are adjusted (Steps S120 and S130).

Moreover, after that, the DSP 32 judges whether or not there is a recording layer to be handled next, i.e. whether or not there is a recording layer that has yet to be subjected to the above-described various adjustments (Step S140).

If it is judged that there is a recording layer to be handled next (a recording layer most distant from the laser light incidence side, second to the recording layer that has most recently been subjected to the various adjustments) (YES at Step S140), based on a set value with respect to the recording layer to be handled next measured beforehand in, for example, the manufacturing process of the apparatus, the BEX motor 22 moves the collimator lens 17 so as to perform spherical aberration correction, and then the DSP 32 controls the optical pickup 1 through the use of the driver 42 so as to make a focus jump to the recording layer to be handled next (Step S150), after which a return is made to Step S60.

On the other hand, if it is judged that there is no recording layer to be handled next (NO at Step S140), it follows that the adjustments with respect to all the recording layers have been completed, and thus the start-up is completed. The respective set values with respect to the recording layers measured beforehand in, for example, the manufacturing process of the apparatus could be stored beforehand in, for example, a non-volatile memory incorporated in the DSP 32.

The foregoing start-up operation can prevent a tracking servo from becoming unlocked during and after a fine adjustment of spherical aberration correction.

Figure 7:
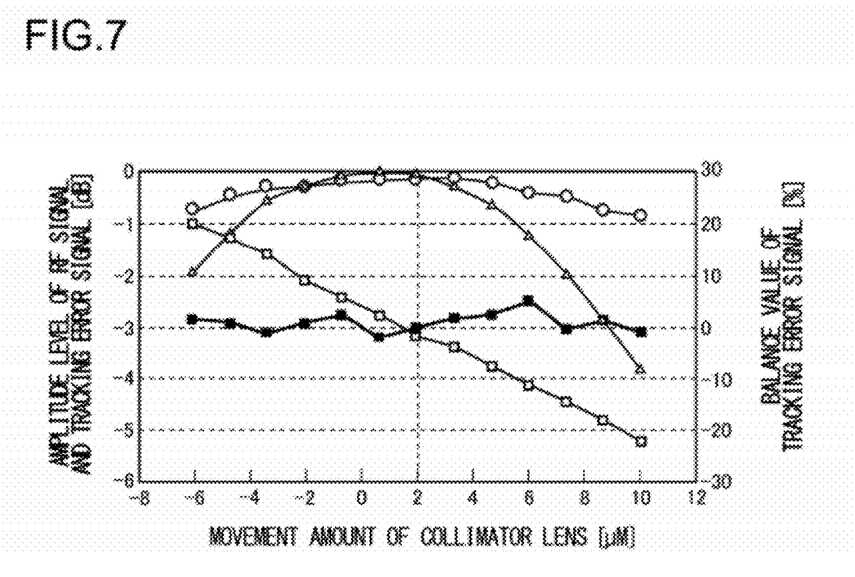
FIG. 7 is a diagram showing characteristic lines related to an amplitude level of an RF signal, an amplitude level of a tracking error signal, and a balance value of a tracking error signal, respectively.

Now, FIG. 7 shows results of determining, using a BD-R_TL (a three-layer recordable BD) compliant to the BDXL standard developed in June, 2010, a relationship between a movement amount of the collimator lens 17 from the reference position and an amplitude level of each of an RF signal and a tracking error signal and a relationship between the movement amount of the collimator lens 17 from the reference position and a balance value of a tracking error signal. It is assumed that, at a time point of completing a rough adjustment of spherical aberration correction with respect to a recording layer L0, a movement amount of the collimator lens 17 from the reference position is 2 μm.

In FIG. 7, a characteristic line connecting hollow circles plotted therein indicates a relationship, with respect to the recording layer L0, between the movement amount of the collimator lens 17 from the reference position and the amplitude level of a tracking error signal, and a characteristic line connecting hollow triangles plotted therein indicates a relationship, with respect to the recording layer L0, between the movement amount of the collimator lens 17 from the reference position and the amplitude level of an RF signal. Further, in this figure, a characteristic line connecting hollow squares plotted therein indicates a relationship, with respect to the recording layer L0, between the movement amount of the collimator lens 17 from the reference position and the balance value of a tracking error signal during and after a fine adjustment of spherical aberration correction in a case where the correction of the balance value of a tracking error signal at Step S80 and at Step S100 shown in FIG. 5 as well as Step S100 are not carried out, i.e. in a case of a typical optical disc apparatus, and a characteristic line connecting solid squares plotted therein indicates a relationship, with respect to the recording layer L0, between the movement amount of the collimator lens 17 from the reference position and the balance value of a tracking error signal during and after the fine adjustment of spherical aberration correction in a case where the correction of the balance value of a tracking error signal at Step S80 and at Step S100 shown in FIG. 5 as well as Step S100 are carried out, i.e. in a case of the optical disk apparatus according to one embodiment of the present invention. On each of the characteristic line connecting the plotted hollow circles and the characteristic line connecting the plotted hollow triangles, a maximum value of an amplitude level of an RF signal or a tracking error signal is set to 0 (dB).

Figure 8A:
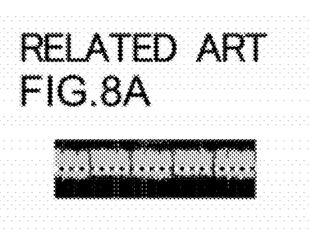
FIGS. 8A, 8B, and 8C are diagrams showing tracking error signals generated in a typical optical disc apparatus.
Figure 8B:
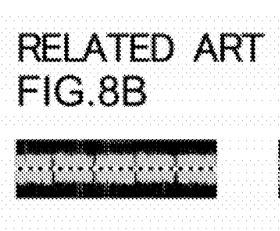
Figure 8C:
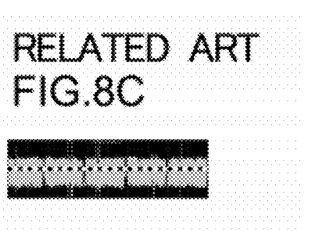

As can be ascertained from FIG. 7, it is found that, in the case of the typical optical disc apparatus, the balance value of a tracking error signal deviates increasingly from 0% with increasing movement amount of the collimator lens 17 during the fine adjustment of spherical aberration correction. For example, in the typical optical disc apparatus, in a case where, during the fine adjustment of spherical aberration correction, the collimator lens 17 is at the same position as a position thereof at a time point of completing a rough adjustment of spherical aberration correction with respect to the recording layer L0, a tracking error signal shown in FIG. 8B is obtained, and there is no possibility of a tracking servo becoming unlocked. On the other hand, in a case where, during the fine adjustment of spherical aberration correction, the collimator lens 17 is at a position displaced by −8STEP from the position thereof at the time point of completing the rough adjustment of spherical aberration correction with respect to the recording layer L0, a tracking error signal shown in FIG. 8A is obtained, and there is a possibility of a tracking servo becoming unlocked. Further, in a case where, during the fine adjustment of spherical aberration correction, the collimator lens 17 is at a position displaced by +8STEP from the position thereof at the time point of completing the rough adjustment of spherical aberration correction with respect to the recording layer L0, a tracking error signal shown in FIG. 8C is obtained, and there is a possibility of a tracking servo becoming unlocked.

In contrast, as can be ascertained from FIG. 7, it is found that, in the case of the optical disc apparatus according to one embodiment of the present invention, even in a case where the collimator lens 17 is moved during the fine adjustment of spherical aberration correction, the balance value of a tracking error signal can be set to be constant in the vicinity of 0%.

While this embodiment adopts a rough adjustment of spherical aberration correction at start-up as a representative example of an adjustment at start-up in which a tracking error signal is used as an index, the present invention is not limited thereto. That is, the present invention may be applied also to a case of performing an adjustment at start-up in which a tracking error signal is used as an index other than the rough adjustment of spherical aberration correction at start-up.

Furthermore, while this embodiment uses a collimator lens as a movable lens for spherical aberration correction disposed in an optical system of the optical pickup, the present invention is not limited thereto. For example, the present invention can be applied also to an optical disc apparatus or the like including a movable lens for spherical aberration correction as part of a plurality of lenses constituting a beam expander.

What is claimed is:

1. An optical disc apparatus, comprising:
an optical pickup that irradiates an optical disc with light and detects returned light from the optical disc by use of a photodetector;
a tracking error signal generation portion that generates a tracking error signal by processing an electric signal outputted from the photodetector;
an RF signal generation portion that generates an RF signal based on an electric signal outputted from the photodetector;
a movable lens position adjustment portion that adjusts and controls a position of a movable lens for spherical aberration correction disposed in an optical system of the optical pickup;
a servo control portion that performs, based on the tracking error signal, tracking control of the optical pickup;
a correction formula determination portion that, before the tracking control by the servo control portion is turned on, determines a correction formula for correcting a balance value of the tracking error signal depending on the position of the movable lens for spherical aberration correction;
an adjustment portion that, after the tracking control by the servo control portion has been turned on, using the RF signal as an index, adjusts the position of the movable lens for spherical aberration correction by use of the movable lens position adjustment portion, while correcting the balance value of the tracking error signal by use of the correction formula determined by the correction formula determination portion; and
a storage portion that stores an adjustment value for adjusting the balance value of the tracking error signal at a time point of completing the adjustment of the position of the movable lens for spherical aberration correction by the adjustment portion.

2. The optical disc apparatus according to claim 1, wherein the correction formula is a relational expression between the position of the movable lens for spherical aberration correction and the adjustment value for adjusting the balance value of the tracking error signal.

3. The optical disc apparatus according to claim 2, wherein the correction formula determination portion detects values of the adjustment value for adjusting the balance value of the tracking error signal obtained when the movable lens for spherical aberration correction is at at least two different positions, respectively, at which the balance value of the tracking error signal becomes optimum, and determines the correction formula based on a result of the detection.

4. The optical disc apparatus according to claim 3, wherein the correction formula determination portion detects values of the adjustment value for adjusting the balance value of the tracking error signal obtained when the movable lens for spherical aberration correction is at two different positions, respectively, at which the balance value of the tracking error signal becomes optimum, and determines a linear approximate expression based on a result of the detection to use it as the correction formula.

5. The optical disc apparatus according to claim 4, wherein in the correction formula, an upper limit value and a lower limit value of the adjustment value for adjusting the balance value of the tracking error signal is set.

6. The optical disc apparatus according to claim 3, wherein in the correction formula, an upper limit value and a lower limit value of the adjustment value for adjusting the balance value of the tracking error signal is set.

7. The optical disc apparatus according to claim 2, wherein in the correction formula, an upper limit value and a lower limit value of the adjustment value for adjusting the balance value of the tracking error signal is set.

* * * * *